UNITED STATES PATENT OFFICE.

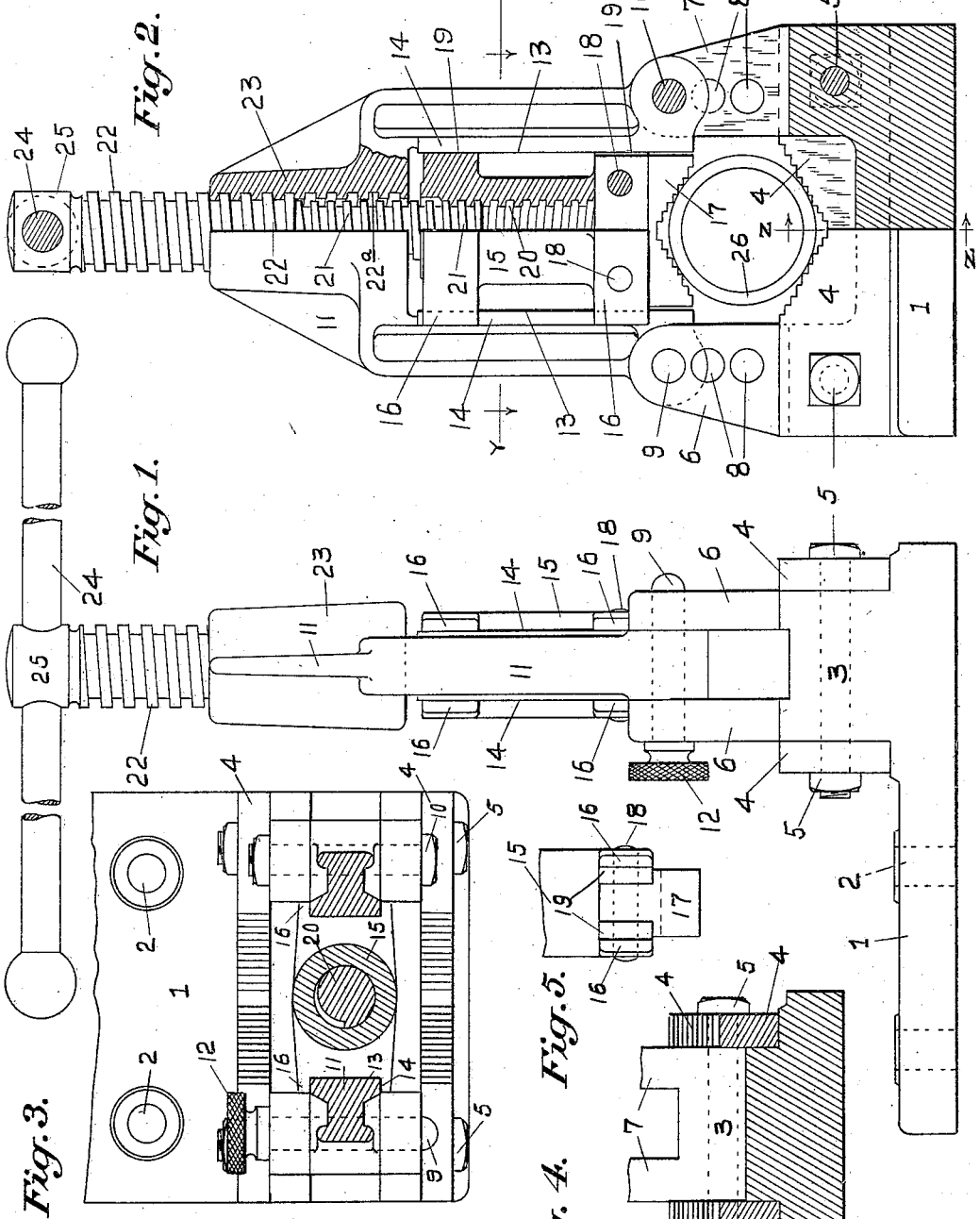

HERBERT H. STEELE, OF MARCELLUS, NEW YORK.

PIPE-VISE.

934,850.

Specification of Letters Patent. Patented Sept. 21, 1909.

Application filed March 25, 1909. Serial No. 485,570.

*To all whom it may concern:*

Be it known that I, HERBERT H. STEELE, a citizen of the United States, residing at Marcellus, in the county of Onondaga and State of New York, have invented a new and useful Pipe-Vise, of which the following is a specification.

My invention relates to improvements in that class of vises, specially adapted to securely hold cylindrical articles like metal pipe and other pipe-fittings, during the operations of cutting-off or threading.

In the many forms of pipe vises now in general use, the movable jaw is forced against the surface of the pipe that rests upon the stationary jaws, by a screw-threaded member provided with a T-handle. This threaded member comprises what are commonly known as square-threads and these square-threads are universally employed to operate the jaws, because of the great strength of the thread to resist the strain derived from the hand-operated T-handle. This strain on the threads is so great, that only coarse threads having considerable cross-sectional area, can be safely employed; and hence, a very large percentage of the grip at the biting faces of the jaws, derived from the leverage at the T-handle, is wasted because of the pitch or angularity of these coarse threads, and excessive power is required to pinch the pipe between the jaws so that the pipe-section will not turn during the threading of the end thereof. The best form of pipe vise, employing these coarse, square threads, will often allow the pipe to slip, causing the toothed-jaws to mutilate the surface of the pipe. In order to provide for a greater grip at the jaws, the screw member must have finer threads and when the standard pitch of the screw is changed, the cross-sectional area of the tooth is correspondingly reduced and there are possibilities of the threads shearing or stripping from the force applied at the T-handle; and for this reason, a finer thread that would require less exertion at the T-handle to give the same pressure at the jaws, is not feasible because of the weakness of the threads in both the screw and the associated nut.

With these several defects in the present form of pipe vise in view, one object of the present invention is to provide a coarse-threaded member to withstand the stress derived from the T-handle, and also adapted and arranged to transmit a movement to the movable jaw of the vise, corresponding to a very fine thread; and hence, insuring a more positive grip at the jaws, with less exertion at the T-handle.

Another object is to provide an open-jawed portable-vise having a threaded member to close the jaws, comprising toothed-sections of different pitches, adapted to convey a differential movement to the closing-up jaw, and which movement increases the bite at the jaws and reduces the amount of applied force at the T-handle.

To the above and other ends, which will hereinafter appear, my invention consists in the novel features of construction, arrangement of parts, and combinations of devices to be hereinafter described and particularly pointed out in the appended claims.

In the accompanying drawing, wherein like reference characters indicate corresponding parts in the various views, Figure 1 is a side elevation of my invention. Fig. 2 a front elevation, partly in section. Fig. 3 a horizontal section through the plane indicated at Y, Y, Fig. 2. Fig. 4 a vertical section on the line Z, Z, Fig. 2; and Fig. 5 an end view of the lower end of the slide carrying the movable jaw.

The base 1 is provided with suitable holes 2 so that the vise as a whole can be secured to a work bench or other support. Heavy lugs 3 are cast upon the upper face of the base and to the opposite faces of these lugs are secured jaw plates 4 as with bolts 5. These plates 4 are formed alike having an angular depression at the upper edge with teeth formed in each inclined face. A pair of ears rise from each lug as indicated at 6 and 7, and each ear is provided with three holes 8; the holes in the ears 6 receiving the locking pin 9 and the holes through the ears 7, the fulcrum-bolt 10.

Between the two ears 7 a U-shaped frame 11 is fulcrumed upon the bolt 10 and locked in operative relation to the base 1 and the associated jaws 4, by the locking pin 9 that is withdrawn each time the frame 11 is swung upon the bolt 10 for purposes presently to appear. The pin 9 is formed with a knurled head 12 to assist the fingers in removing the locking pin.

The frame 11 is formed as shown, to provide bearing faces 13 and 14 along the inner edges of each leg of the frame, and these faces provide a bearing for the slide 15 formed with ears 16 to overlap and bear upon the faces 14 and also to bear against the inner faces 13. The lower end of the slide 15 is slotted to receive the movable jaw 17 that is secured to the slide and within the slot by two pins 18. The slotting of the lower end of the slide provides for two bearing faces 19 at each side, to engage with the faces 13 of the frame; the upper faces 19 have a full bearing equal to the width of the face 13. The jaw 17 has a toothed-depression at the center similar to the lower jaws 4. The slide 15 is threaded interiorly as at 20, to form a stationary nut for the lower end of a screw-threaded member 21. The upper portion of this screw member is also threaded at 22 to engage with similar threads 22$^a$ formed within the cylindrical upper extension 23 of the frame 11. This screw member 21—22 at the upper end is provided with a T-handle 24 that passes through the unthreaded section 25.

A close inspection of the drawing will disclose the fact that this jaw-operating feed-screw has peculiar characteristics; that the threaded section 21 is smaller in diameter than the screw section 22; that the threads of the section 21 are a little closed together than the threads of 22; that the direction of the lead, is the same in both sections. In a full-sized vise, the screw 21 may have ten threads to the inch and the screw 22 eight threads to each linear inch. The screw 22 is only operative with the threads 22$^a$ within the section 23 and the screw 21 will only coöperate with the threads 20 within the slide 15. The object of giving the screw 21 a smaller diameter than 22 is, because the screw 21 must enter the threaded hole in 23 without engaging with the threads thereof. From this description it will be seen that the threaded element that controls the movement of the slide 15 and its associated jaw 17, comprises two separate threaded sections that vary from each other in the number of threads to the inch, and that one section is provided with a stationary nut and the other section with a movable nut. When a pipe-section indicated at 26 in Fig. 2, is adjusted to the jaws 4, the frame 11 is swung into position and secured by the locking pin 9. The T-handle 24 is turned in the direction of the hands of a clock; this rotary movement of the T-handle causes the screw 22 to thread itself into the section 23 and the screw 21 to thread itself within the slide 15. If the pitch of the threads 21 and 22 were equal, the movement of both screws would not affect the position of the slide 15 and jaw 17. But the screw 22 having eight threads to the inch the said screw will move in the direction of its axis one-eighth of an inch at each revolution of the T-handle; the screw 21 will move in the same direction and the same distance, but the threads thereof passing within the movable slide 15, will draw the slide in the opposite direction to the movement of the screw, one-tenth of an inch; and hence for every rotation of the T-handle 24, the slide and its associated jaw 17 will move in the direction of the screw toward the two lower jaws 4, a distance equal to the difference between one-eighth and one-tenth of an inch, or one-fortieth of an inch. Or in other words, the coöperation of these two coarse-threaded sections of the slide-feeding-screw, will convey to the movable jaw, a movement toward the stationary jaws that is equivalent to a feed movement from a single-screw-feed having forty threads to the linear inch; a thread so fine as to be useless under the strain derived from the T-handle to grip the pipe. With this differential arrangement between the feeding element and the movable jaw, approximately four times the pressure is obtained at the jaws from a given force at the T-handle, than can be obtained from a single-screw-feed. Or to put it another way, with this differential form of transmission the same pressure can be obtained at the pipe-gripping jaws with only one-quarter of the force applied at the hand-operated T-handle.

It being necessary to adapt a pipe vise to varying diameters of pipe, the six holes 8 in the ears 6 and 7 are provided to change the relative position of the swinging frame 11 to the base 1. Thus, if the scope of the screw 21—22 will not move the jaw 17 against the inserted pipe, the bolt 10 is withdrawn from the upper holes and adjusted to the next lower holes in the ears 7; and the frame 11 is locked in operative position by the pin 9 passing within the next lower holes 8 in the ears 6. This adjustment can again be reduced by using the lowest holes 8. The relative adjustment of the frame 11 to these three positions, will provide for the usual variations in the sizes of pipe, that the commercial number of the vise predetermines.

While I have shown and described for the differential feeding element, a ratio of eight to ten, it will be understood that this ratio can be changed, so as to increase or diminish the relative movement of the slide, by changing the lead of one or both screws 21 or 22. And while I have described my invention as a pipe-vise adapted for cylindrical surfaces, it will be understood that I do not limit myself to the specific form of jaws shown, but that the form of the jaws and the nature of the jaw's teeth can be changed to adapt the clamping features to other surfaces than cylindrical faces.

Various other changes in details of construction may be made without departing from the gist of my improvements as expressed in the following claims.

What I claim and desire to secure by Letters Patent, is—

1. The combination with a two-part vise adjustably hinged together, of a stationary jaw in one part, a sliding jaw in the other part, and a screw having threaded sections of different characteristics and adapted to convey a differential movement to the sliding jaw.

2. The combination with a two-part vise adjustably hinged together, of a stationary jaw in one part, a sliding jaw in the other part, and a differentially threaded member adapted to move the sliding jaw into coöperation with the stationary jaw to increase the bite of the jaws.

3. The combination with a two-part vise adjustably hinged together, of a pair of stationary jaws on one part, a single sliding jaw within the other part, and a differentially threaded member adapted to operate the sliding jaw to increase the biting power of the jaws.

4. The combination with a two-part vise adjustably hinged together, of a pair of stationary jaws secured to one part, a sliding jaw arranged within the other part to pass between the planes of the stationary jaws, and a differentially threaded member adapted to coöperate with the sliding jaw to increase its biting power when in coöperation with the stationary jaws.

5. In a vise, the combination with a base having stationary jaws, of a frame adjustably hinged to the base, a slide housed within the frame and provided with a jaw, and means coöperative with the frame and the said slide to differentially move one jaw into coöperation with the associated jaws.

6. In a vise, the combination with a base having stationary jaws, of a frame adjustably hinged to the base, a sliding member housed within the frame and provided with a jaw, and a threaded member that is coöperative with the frame and the said sliding member to differentially force one jaw into gripping engagement with the associated jaws.

7. In a vise, the combination with a base having stationary jaws, of a frame adjustably hinged to the base, a sliding member housed within the frame and provided with a jaw, and a feed screw threaded through the frame for one lead and threaded within the slide for a different lead and both coöperating to convey a differential movement to the sliding member and its associated jaw.

8. In a vise, the combination with a base, of a frame adjustably hinged to the base, a sliding member housed within the frame, coöperating jaws secured to the base and sliding member, and a feeding element for the sliding member comprising screw-sections of different characteristics.

9. In a vise adapted for cylindrical objects, the combination with a base having stationary jaws, of a coöperating movable jaw adjustably hinged to the base, and means to differentially move one jaw into coöperation with the other jaws.

10. In a pipe vise adapted to cylindrical surfaces, the combination with a base including a pair of stationary toothed-jaws, of a frame adjustably hinged to the base, a slide housed within said frame, a toothed-jaw secured to said slide, and a feed member adapted to differentially move the slide and shift the associated toothed-jaw into coöperation with the pair of stationary jaws.

11. In a pipe vise adapted to cylindrical surfaces, the combination with a base including a pair of stationary toothed-jaws, of a frame adjustably hinged to the base, a slide housed within said frame, a toothed-jaw secured to said slide, and a feed-screw having threaded-sections of different characteristics adapted to convey a differential movement to the slide and its associated jaw.

12. In a pipe vise adapted to cylindrical surfaces, the combination with a base including a pair of stationary toothed-jaws, of a frame adjustably hinged to the base, a sliding-jaw housed within said frame, and a feed-screw comprising a coarse-threaded section and a finer-threaded section, both threaded-sections coöperating jointly to convey a differential movement to the sliding-jaw.

13. In a pipe vise adapted to cylindrical surfaces, the combination with a base including a pair of stationary toothed-jaws, of a swinging frame adjustably hinged to the base, a slide housed within said frame, a toothed-jaw secured to said slide, and a feed-screw comprising differentially threaded-sections adapted to coöperate with the frame and with the slide to move the associated jaw into coöperation with the stationary jaws.

14. In a pipe vise adapted to cylindrical surfaces, the combination with a base including a pair of stationary jaws, of a swinging frame adjustably hinged to the base, a slide housed within said frame, a jaw secured to said slide, and a feed-screw comprising differentially threaded-sections, one section engaging with the frame and the other section engaging with the slide and both sections coöperating to convey a differential movement to the slide and its associated jaw.

15. In a vise adapted for cylindrical objects, the combination with a base including a stationary jaw, of a coöperating movable jaw adjustably hinged to the base, and means to differentially move one jaw into coöperation with the other jaw.

16. In a vise adapted for cylindrical objects, the combination with a base including a stationary jaw, of a coöperating sliding jaw adjustably hinged to the base, and a threaded member to differentially move one jaw into coöperation with the other jaw.

17. In a vise adapted for cylindrical surfaces, the combination with a base including a stationary jaw, of a coöperating sliding jaw adjustably hinged to the base, and a multiple-threaded member to differentially move one jaw into coöperation with the other jaw.

18. In a vise adapted for cylindrical surfaces, the combination with a base including a stationary jaw, of a sliding jaw adjustably hinged to the base, and a multiple-threaded element adapted to move one of the jaws into coöperation with the other jaw through the differential arrangement of the threads.

19. In a vise adapted for cylindrical surfaces, the combination with a base having stationary jaws, of a coöperating movable jaw adjustably hinged to the base, and a feed-screw comprising a coarse threaded section and a finer threaded section, both threaded sections coöperating to convey a differential movement to the sliding jaw.

20. In a vise adapted for cylindrical surfaces, the combination with a base having stationary jaws, of a coöperating movable jaw adjustably hinged to the base, a threaded member to operate the movable jaw, and means formed integral with the threaded member adapted to convey a differential movement to the movable jaw relative to the movement of the threaded member in the direction of its axis.

21. The combination with a two-part vise adjustably hinged together, of a stationary jaw in one part, a sliding jaw in the other part, and means to differentially move one jaw into coöperation with the other jaw.

22. The combination with a two-part vise adjustably hinged together, of a stationary jaw in one part, a sliding jaw in the other part, and a feed screw adapted to differentially move one jaw into coöperation with the other jaw.

23. The combination with a two-part vise adjustably hinged together, of a stationary jaw in one part, a sliding jaw in the other part, and a feed screw having threaded sections of different characteristics adapted to differentially move one jaw into coöperation with the other jaw.

24. The combination with a two-part vise adjustably hinged together, of a stationary jaw in one part, a sliding jaw in the other part, and a multiple-threaded member adapted to differentially move one jaw into coöperation with the other jaw.

25. The combination with a two-part vise adjustably hinged together, of a stationary jaw in one part, a jaw-carrying slide mounted within the other part, and means to differentially operate said slide to bring the jaws into coöperation.

26. In a vise, the combination with a base including a stationary jaw, of a frame adjustably hinged to the base, a jaw-carrying-slide mounted for movement within said frame, and means to differentially operate the slide to bring the jaws into coöperation.

27. In a vise, the combination with a base including a stationary jaw, of a frame adjustably secured to the base, a jaw-carrying-slide mounted for movement within said frame, and manually operable means to differentially move the slide and bring the jaws into coöperation.

28. The combination with a two-part vise adjustably hinged together, of a stationary jaw in one part, a jaw-carrying-slide mounted within the other part, and a compound-threaded member adapted to differentially operate the slide and bring the jaws into coöperation.

29. The combination with a two-part vise adjustably hinged together, of a stationary jaw in one part, a jaw-carrying-slide mounted within the other part, and a feed-screw having threaded sections of varying characteristics adapted to differentially operate the slide and bring the jaws into coöperation.

30. In a vise, the combination with a base including a stationary jaw, of a frame adjustably hinged to the base, a jaw-carrying-slide mounted within said frame, and a feed-screw having threaded sections of varying pitches adapted to differentially operate the slide and force the jaws into coöperation.

31. In a vise, the combination with a base including a stationary jaw, of a frame adjustably hinged to the base, a jaw-carrying-slide mounted within said frame, and a feed-screw having threaded sections of varying diameters and pitches adapted to differentially operate the slide and force the jaws into coöperation.

32. In a vise adapted for cylindrical surfaces, the combination with a base including a stationary jaw, of a coöperating movable jaw adjustably hinged to the base, and means to differentially move one jaw into or out of coöperation with the other jaw.

33. The combination with a two-part vise adjustably hinged together, of a stationary jaw in one part, a sliding jaw in the other part, and means to differentially control the sliding movement of one jaw in either direction.

34. The combination with a two-part vise adjustably hinged together, of a stationary jaw in one part, a sliding jaw in the other part, and a differentially threaded member adapted to positively control the movement of the sliding jaw in both directions.

35. The combination with a two-part vise adjustably hinged together, of a stationary jaw in one part, a sliding jaw in the other part, and a multiple threaded element adapted to positively control the movement of the sliding jaw in either direction.

36. The combination with a two-part vise adjustably hinged together, of a stationary jaw in one part, a jaw-carrying-slide mounted within the other part, and a differentially threaded element adapted to positively control the movement of the slide and move the associated jaw in either direction.

37. In a vise, the combination with a base including a stationary jaw, of a frame adjustably hinged to the base, a jaw-carrying-slide mounted within said frame for movement in two directions, and means to differentially operate the slide in both directions.

38. In a vise, the combination with a base including a stationary jaw, of a frame adjustably hinged to the base, a jaw-carrying-slide movable in two directions within said frame, and a multiple threaded element adapted to positively control the movement of the slide in both directions.

39. The combination with a two-part vise adjustably hinged together, of a stationary jaw in one part, a jaw-carrying-slide movable in two directions within the other part, and a compound-threaded member adapted to differentially operate the slide in both directions.

In testimony whereof I have signed my name to this specification in the presence of two subscribing witnesses.

HERBERT H. STEELE.

Witnesses:
GEORGE L. COLING,
MARIE K. UNDERDOWN.